(12) United States Patent
Rastegar et al.

(10) Patent No.: US 8,525,392 B2
(45) Date of Patent: Sep. 3, 2013

(54) GENERATORS FOR VERY-HIGH-G ENERGY HARVESTING

(75) Inventors: Jahangir S. Rastegar, Stony Brook, NY (US); Richard T. Murray, Patchogue, NY (US)

(73) Assignee: Omnitek Partners LLC, Ronkonkoma, NY (US)

( * ) Notice: Subject to any disclaimer, the term of this patent is extended or adjusted under 35 U.S.C. 154(b) by 340 days.

(21) Appl. No.: 13/026,283

(22) Filed: Feb. 13, 2011

(65) Prior Publication Data

US 2011/0204751 A1 Aug. 25, 2011

Related U.S. Application Data

(60) Provisional application No. 61/304,420, filed on Feb. 13, 2010.

(51) Int. Cl.
*H01L 41/113* (2006.01)
(52) U.S. Cl.
USPC .......................................... 310/339

(58) Field of Classification Search
USPC .......................................... 310/339
See application file for complete search history.

(56) References Cited

U.S. PATENT DOCUMENTS

| | | | | |
|---|---|---|---|---|
| 3,285,074 A | * | 11/1966 | Elazar | 73/514.34 |
| 3,363,566 A | * | 1/1968 | Giattino et al. | 102/210 |
| 7,762,191 B2 | * | 7/2010 | Rastegar et al. | 102/210 |
| 7,999,402 B2 | * | 8/2011 | Freeland et al. | 290/1 R |
| 2007/0278902 A1 | * | 12/2007 | Rastegar et al. | 310/339 |
| 2010/0236440 A1 | * | 9/2010 | Rastegar | 102/209 |

\* cited by examiner

*Primary Examiner* — Thomas Dougherty (57) ABSTRACT

A method for harvesting energy from a high-G acceleration of a munition. The method including: proving a vibrating mass-spring unit in a housing of an energy harvesting device; and reducing an effective acceleration on the mass-spring unit by one or more of: offsetting the vibration of the mass-spring unit with respect to a direction of the high-G acceleration; biasing a mass of the mass-spring unit in a direction having at least a component in the direction of the high-G acceleration; limiting a vibration deflection of at least a portion of the mass-spring unit in the direction of the high-G acceleration; or limiting an amount of vibration of the mass-spring unit in a direction offset from the direction of the high-G acceleration and removing such limit after the acceleration.

18 Claims, 6 Drawing Sheets

GENERATORS FOR VERY-HIGH-G ENERGY HARVESTING

CROSS-REFERENCE TO RELATED APPLICATIONS

This application claims benefit to U.S. Provisional Application No. 61/304,420 filed on Feb. 13, 2010, the entire contents of which is incorporated herein by reference.

BACKGROUND OF THE INVENTION

1. Field of the Invention

The present invention relates generally to generators, and more particularly, to generators for very-high-G energy harvesting.

2. Prior Art

All existing and future smart and guided projectiles and those with means of one-way or two-way communications with a command or tracking station or with each other require electric power for their operation. In addition, as munitions are equipped with the means of communicating their type and characteristics with the firing system to ensure that the intended round is being used and for fire control purposes, and for health monitoring and diagnostics runs before loading, they would require a low level of power supply minutes and sometimes even seconds before being loaded into the gun system. The amount of power required for the proper operation of such smart and guided munitions or those equipped with the aforementioned health monitoring and diagnostics capabilities, is dependent on their mode of operation and the on-board devices that have to be powered. The amount of power requirement is fairly small if the projectile is required to only receive a RF or other similar signal and to power sensors such as MEMs types of accelerometers and rate gyros or health monitoring and diagnostics related electronics. The power requirement is increased if the projectile is also required to communicate back to the ground or some mobile station. The power requirement, however, becomes significant when the projectile has to be equipped with electric or smart materials based actuation devices for guidance and control, particularly if the projectile is required to become highly maneuverable over long traveling times and while traveling at relatively high speeds such as supersonic speeds.

SUMMARY OF THE INVENTION

Accordingly, an energy harvesting device is provided. The energy harvesting device comprising: a housing having an internal cavity; an energy generating device arranged in the cavity; and a mass-spring element having a mass and an elastic element and being operatively connected to the energy generating device upon an acceleration of the housing to produce an electrical power; wherein the mass-spring element vibrates in a longitudinal direction of the cavity upon an acceleration of the housing and the longitudinal direction of the housing is arranged offset from a direction of the acceleration.

The energy generating device can be a piezoelectric element, the mass being arranged at one end of the elastic element and another end of the elastic element being connected to the piezoelectric element.

The elastic element can be a helical spring.

The mass can be integrally formed with the elastic element.

The mass-spring element can includes a bore and an additional mass connected to the mass and disposed in the bore.

Also provided is an energy harvesting device comprising: a housing having an internal cavity; an energy generating device arranged in the cavity; a mass-spring element having a mass and an elastic element and being operatively connected to the energy generating device upon an acceleration of the housing to produce an electrical power; and a biasing member for biasing the mass in a direction having at least a component in an acceleration direction of the housing.

The energy generating device can be a piezoelectric element, the mass being arranged at one end of the elastic element and another end of the elastic element being connected to the piezoelectric element.

The elastic element can be a helical spring.

The piezoelectric element can comprise two piezoelectric elements arranged in the cavity and the elastic element comprises two elastic elements, each of the two elastic elements having a one end connected to the mass and another end connected to one of the two piezoelectric elements.

The biasing member can include a portion for engaging a portion of the mass. The portion of the biasing member can include one of a tab or indent and the portion of the mass includes the other of the tab or indent.

The biasing member can be configured to deform upon an acceleration of the housing to preload the elastic element such that the mass-spring unit vibrates in the cavity after the acceleration ceases or diminishes. The deformation of the biasing member can be a plastic deformation.

Still further provided is an energy harvesting device comprising: a housing having a cavity; an energy generating device arranged in the cavity; a mass-spring unit having an elastic element and a mass, the mass being a free end of the elastic element and arranged to vibrate in a direction of an acceleration of the housing; wherein the elastic member includes one or more stops arranged in a longitudinal direction of the elastic member and the housing includes a support corresponding to each of the one or more stops so as to limit a longitudinal deflection of the one or more stops.

The energy generating device can be a piezoelectric element.

The one or more stops can include one stop which corresponds to the free end of the elastic element.

The elastic element can have a length in the longitudinal direction and the one or more stops comprises two or more stops arranged along the length of the elastic member, the housing including a support corresponding to each of the two or more stops. The elastic element can have a cylindrical shape and the support can comprise a groove formed in the housing corresponding to each of the two or more stops. The elastic element can have a pyramid shape and the support can have a mating pyramid shape having a step shaped support corresponding to each of the two or more stops.

Still further provided is an energy harvesting device comprising: a housing having a cavity; an energy generating device arranged in the cavity; a mass-spring element having a mass and an elastic element and being operatively connected to the energy generating device upon an acceleration of the housing to produce an electrical power; and a spacer arranged in the cavity, the spacer having a first position so as to limit a vibration of the mass-spring unit and a second position permitting the mass-spring unit to vibrate, the spacer being movable from the first position to the second position due to an acceleration of the housing.

the energy generating device can be a piezoelectric element, the mass being arranged at one end of the elastic element and another end of the elastic element being connected to the piezoelectric element.

The mass-spring unit can be configured to vibrate in a direction offset from a direction in which the spacer is movable. The direction offset from the direction in which the spacer is movable can be orthogonal to the direction in which the spacer is movable.

The elastic element can include first and second elastic elements, each having an end attached to the mass.

Still further yet provided is a method for harvesting energy from a high-G acceleration of a munition, the method comprising: proving a vibrating mass-spring unit in a housing of an energy harvesting device; and reducing an effective acceleration on the mass-spring unit by one or more of: offsetting the vibration of the mass-spring unit with respect to a direction of the high-G acceleration; biasing a mass of the mass-spring unit in a direction having at least a component in the direction of the high-G acceleration; limiting a vibration deflection of at least a portion of the mass-spring unit in the direction of the high-G acceleration; or limiting an amount of vibration of the mass-spring unit in a direction offset from the direction of the high-G acceleration and removing such limit after the acceleration.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Generators in the form of piezoelectric-based energy-harvesting power sources are presented for very high-G gun-fired munitions (over 20,000 and up to over 200,000 Gs). The power sources harvest energy from a firing acceleration of a munition and in certain applications also from in-flight vibrations. The harvested energy is converted to electrical energy using piezoelectric elements. In general, the power sources can be used for powering onboard electronics, particularly for powering fuzing, in many cases eliminating the need for onboard batteries.

During the munitions firing, the firing acceleration acts on the effective mass of mass-spring elements provided in the energy harvesting power sources, deforming the elastic element (such as a spring), thereby causing mechanical potential energy to be stored in the mass-spring elements. Once the firing acceleration has ended, the spring-mass system is free to vibrate. The periodic force generated due to the vibration of the mass-spring element is used to deform piezoelectric elements, thus converting part of the mechanical vibration energy to electrical energy in the form of charges that can then be harvested for direct use and/or for storage in an electrical storage device, such as a capacitor.

Figure 1:
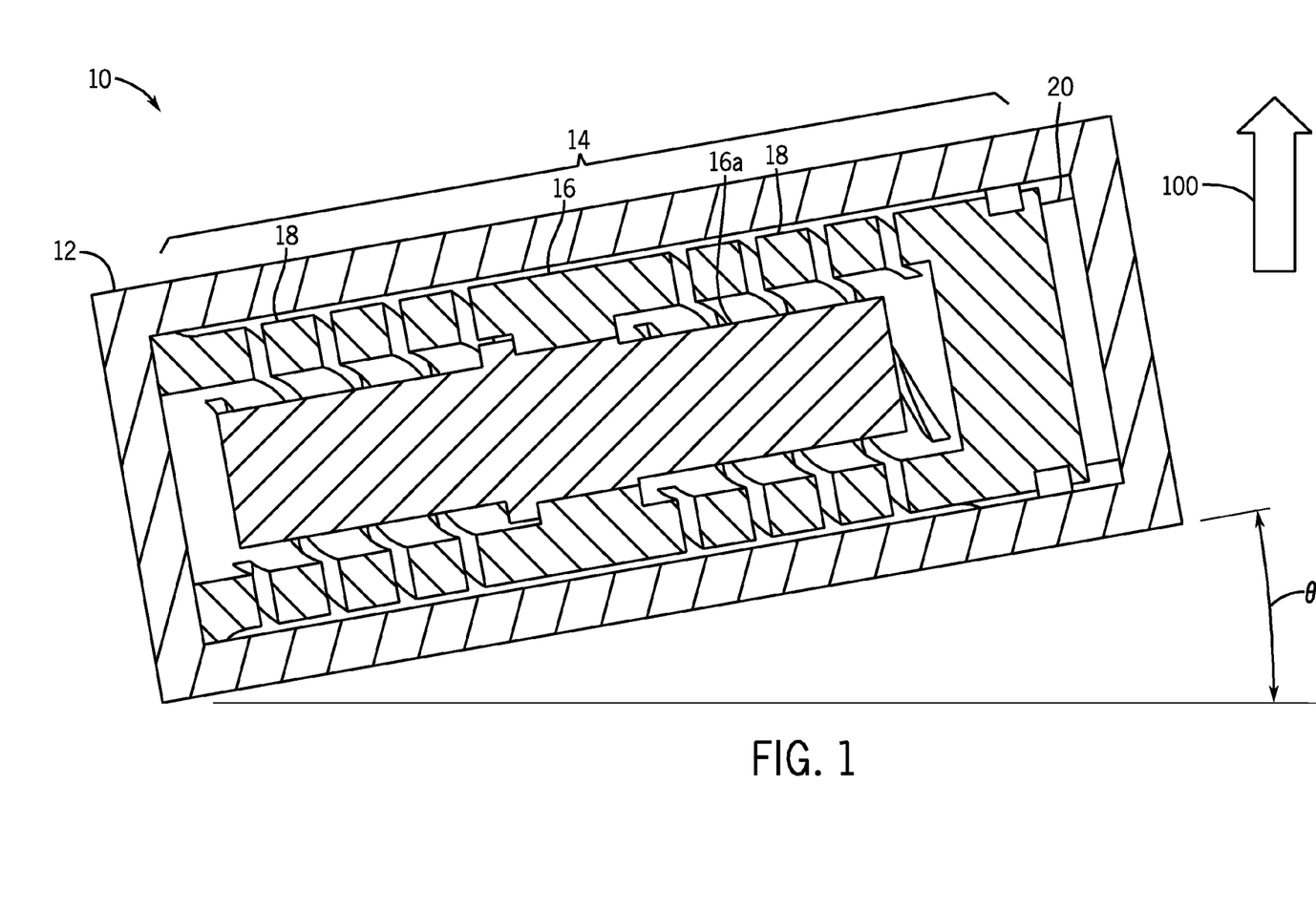
FIG. 1 illustrates a sectional view of an embodiment of an energy harvesting power source.

An embodiment of an energy harvesting power source (alternatively referred to herein as a "generator") is illustrated in FIG. 1 and generally referred to by reference numeral 10. The generator 10, includes a housing 12, having a cavity in which is housed a mass-spring element 14. The mass-spring element 14 includes a mass 16 and one or more elastic elements (such as a spring) 18. In the configuration illustrated in FIG. 1, the elastic element is a helical spring and the mass 16 is integral with the helical spring and centrally positioned about two of the springs 18. In the configuration illustrated in FIG. 1, an additional mass 16a, connected to mass 16, can also be provided in a central cavity of the mass-spring element 14 to increase an efficiency thereof. An end of at least one of the springs 18 is attached to a piezoelectric material 20, which in turn is operatively connected to a storage device, power consuming device and/or conditioning circuitry as necessary or applicable for the application at hand.

In the generator 10 illustrated in FIG. 1, since the magnitude of the firing acceleration is in the very-high-G range which can cause significant damage and failure to the generator 10, the magnitude of the firing acceleration acting on the mass-spring element 14 of the generator 10 is effectively reduced by reclining the generator relative to the direction of the firing acceleration (the direction of the firing acceleration is considered to be upwards as indicated by the arrow 100). The angle θ that the generator 10 is reclined may be specified based on the parameters of the system and the firing acceleration profile. The angle θ determines the magnitude of the component of the firing acceleration (in the direction of the arrow 100) that acts in the direction of preloading the mass-spring element 14 (direction of free movement of the mass-spring element 14 and its vibration). For example if the acceleration in the direction of the arrow 100 is A, then the mass 16 of the mass-spring element 14 is accelerated downward along its housing 12 by an acceleration equal to (A sin θ).

During the firing, the acceleration A causes the mass 16 of the mass-spring element 14 of the generator 10 to be accelerated inside the generator housing 12 by an acceleration of the magnitude (A sin θ). The mass 16 is also accelerated with an acceleration of the magnitude (A cos θ), causing it to move towards the interior of the generator housing 12. For high enough firing acceleration A, the mass 16 can be brought into contact with an interior surface of the housing, thereby limiting the amount of its lateral displacement. The friction generated between the mass 16 and the housing surface acts against the aforementioned movement of the mass 16 to preload the elastic element 18 of the mass-spring unit 14.

In general, since the friction forces are highly unpredictable, it is highly preferable to provide contact surface with minimal coefficients of friction. Alternatively, anti-friction bearings may be provided (e.g., by mounting rolling balls on the mass element). Alternatively, the mass 16 may be attached to the interior surface of the housing 12 by beam-like elements (preferably with living joints—such as flexural joints) to keep the mass 16 from coming into contact with the inner housing surface. Then as the firing acceleration has ended, the mass-spring element 14 of the generator 10 is forced back towards its central positioning inside the generator housing 12 and the mass-spring element 14 begins to vibrate, thereby allowing the generator 10 to begin to generate electrical energy.

In the configuration shown in FIG. 1, a spring-mass arrangement which is essentially two spring mass elements (one on each side of a central concentrated mass) which are pre-loaded in compression to prevent separation of the loading surface of the upper spring-mass from the piezoelectric element. This design is shown for illustration purposes only and in practice any other type of such generators, such as those disclosed in U.S. Pat. Nos. 7,231,874; 7,312,557; 7,762,191; 7,762,191 and 7,701,120, the entire contents of each of which are incorporated herein by reference. In addition, any other type of mechanical to electrical energy conversion element such as magnet and coil type elements may also be used in place of the indicated piezoelectric elements, as disclosed in U.S. Pat. No. 7,777,396, the entire contents of which is incorporated herein by reference.

Figure 2:
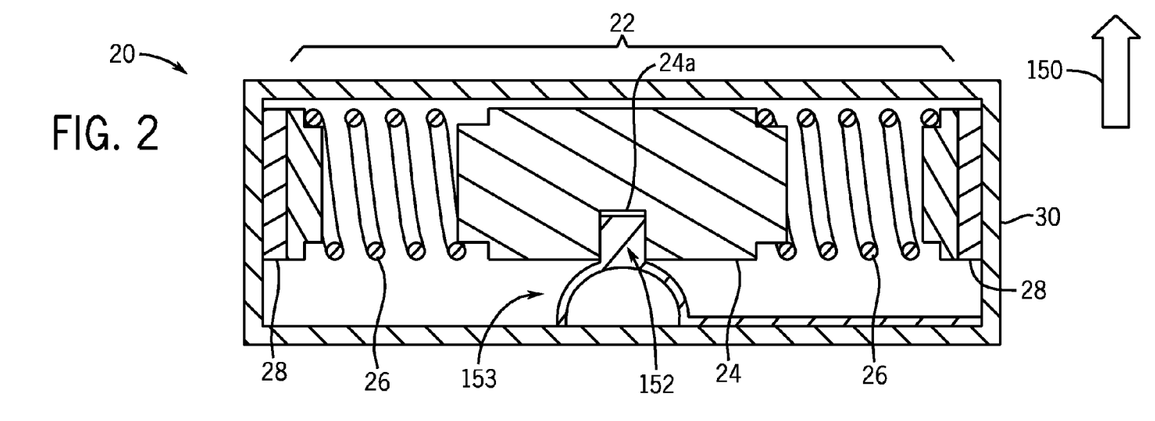
FIG. 2 illustrates a sectional view of another embodiment of an energy harvesting power source.
Figure 3:
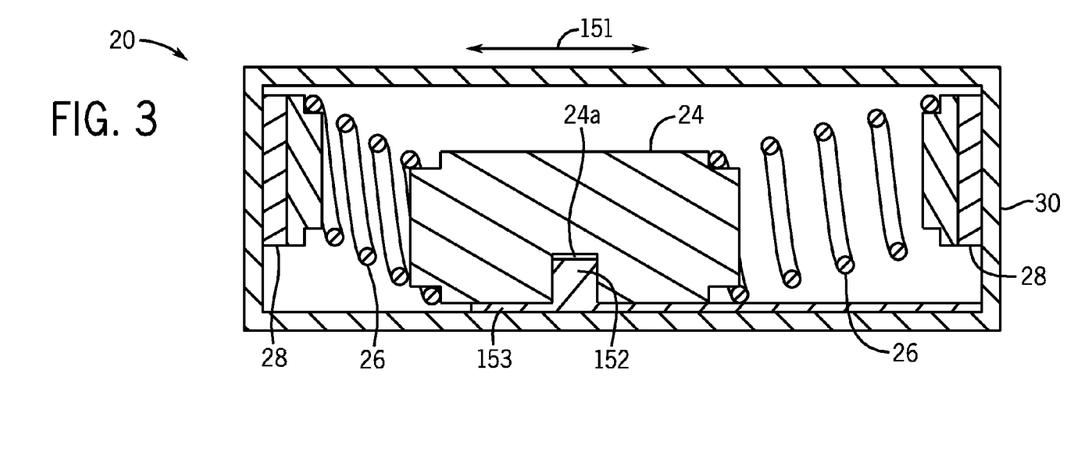
FIG. 3 illustrates a sectional view of the energy harvesting device of FIG. 2 during an acceleration event.

Referring now to FIGS. 2 and 3, there is shown another embodiment of a generator, generally referred to by reference numeral 20. The energy harvesting device used in the generator 20 of FIG. 2 is a mass-spring unit 22 having a centrally located mass 24 and springs 26 disposed at each end of the mass 24, where each free end of the springs 26 is connected to a piezoelectric element 28. The mass-spring unit 22 is housed in a cavity of a housing 30, which can be cylindrical. It is noted that the specific design shown in FIG. 2 is for the purpose of illustrating the general mode of operation of the generator and that such generators may be designed in numerous other configurations but operating by the basic principles that are described below for the design shown in the schematic of FIG. 2.

The generator is positioned such that the firing acceleration shown by the arrow 150 is offset to the direction of the generator mass-spring vibration as indicated by the vector 151, such as the direction of vibration 151 is perpendicular to the direction of acceleration 150, as shown in FIG. 2. During the firing, the mass 24 will experience a force downward (opposite to the direction of acceleration), which would tend to deflect the springs 26 in the same direction, i.e., perpendicular to the axial direction of the generator, i.e., in the direction of the generator mass-spring unit vibration, as indicated by the arrow 151 in FIG. 2. A preloading tab 153 disposed in the cavity is engaged with the mass 24, such as with notch 24a. Upon downward deflection, the preloading tab 153 loads the generator by deflecting the springs along the generation axis 151 as shown in FIG. 3. The preloading tab 153 can be plastically deformed in this process, and as the firing acceleration ends (usually during a set-forward projectile deceleration), the mass element rebound upwards, thereby an engaging tip 152 of the preloading tab 153 disengages the mass element of the mass-spring unit and the mass-spring unit 22 can begin to vibrate at its natural frequency, passing mechanical energy to the piezoelectric elements located at one or both stationary ends of the generator springs, resulting in an output of power from the piezoelectric elements.

Such a design has particular utility in applications where space along the axis of the projectile is limited, or where a relatively large number of piezoelectric stacks are required for rapid power generation and/or may be subject to crushing (possibly from just their own mass).

It is noted that the preloading tab 153 shown in the schematic of FIGS. 2 and 3 may take numerous different configurations and use components such as toggle type of linkages that engages the mass element of the mass-spring unit, and that during the firing acceleration period, rotate (clockwise or counterclockwise) to push the mass element to the right or to the left, and which are then released (pulled away from the mass to disengage their engaging tip) as the firing acceleration is ended. Such toggle type mechanisms can be spring loaded to keep them engaged with the mass element and to keep them away from the vibrating mass upon firing.

Figure 4:
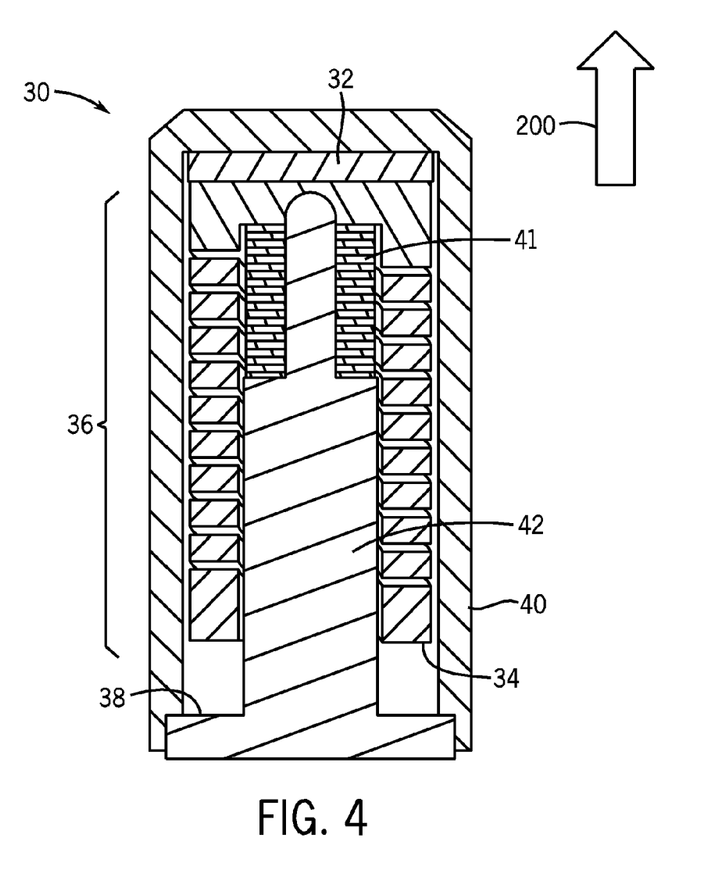
FIG. 4 illustrates a sectional view of another embodiment of an energy harvesting power source.

Referring now to FIG. 4, there is shown another embodiment of a generator, generally referred to by reference numeral 30. In certain applications, particularly due to space requirements, the generator is preferred to maintain its direction of mass-spring unit vibration parallel to the firing acceleration. In the generator 30 of FIG. 4, a piezoelectric element 32 is positioned at the top (in the direction of acceleration 200) of the generator 30. Considering the "piezoelectric-on-top" design as illustrated in FIG. 4, in a very-high-G acceleration, a free end 34 of a spring element 36 will extend to a hard-stop 38 at a bottom of a generator housing 40, effectively immobilizing the end 34 of the spring 36 during the firing. The reaction body forces will still be acting on the "span" of each strand of the spring, and may lead to plastic deformation if the acceleration is sufficiently high. Clearly, the strands must be somehow supported along the length of the spring to prevent damage, such as with member 42 and an inner surface of the housing 40. The spring 36 may also be supported by one or more spring washers 41.

Figure 5A:
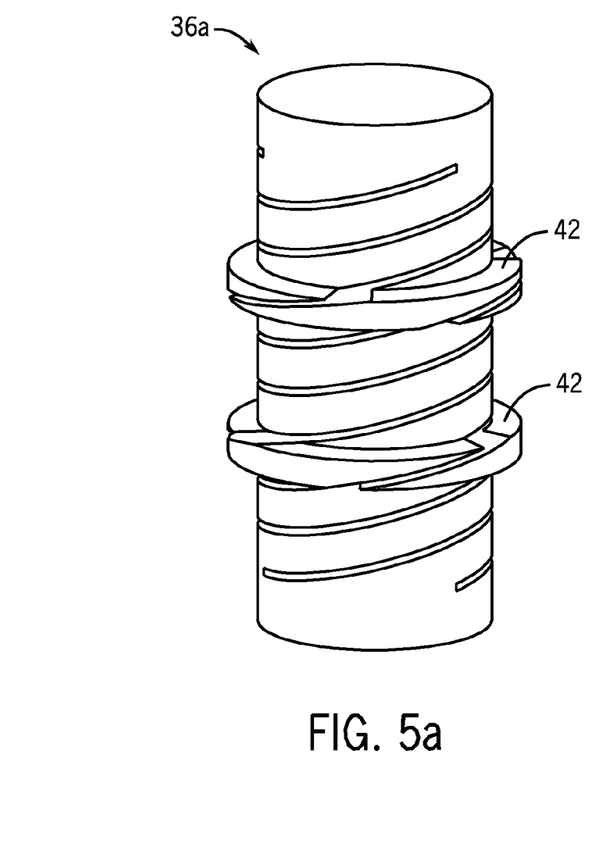
FIGS. 5a and 5b illustrates a variation of a spring element and sectional view of the energy harvesting device of FIG. 4 using such spring element.
Figure 5B:
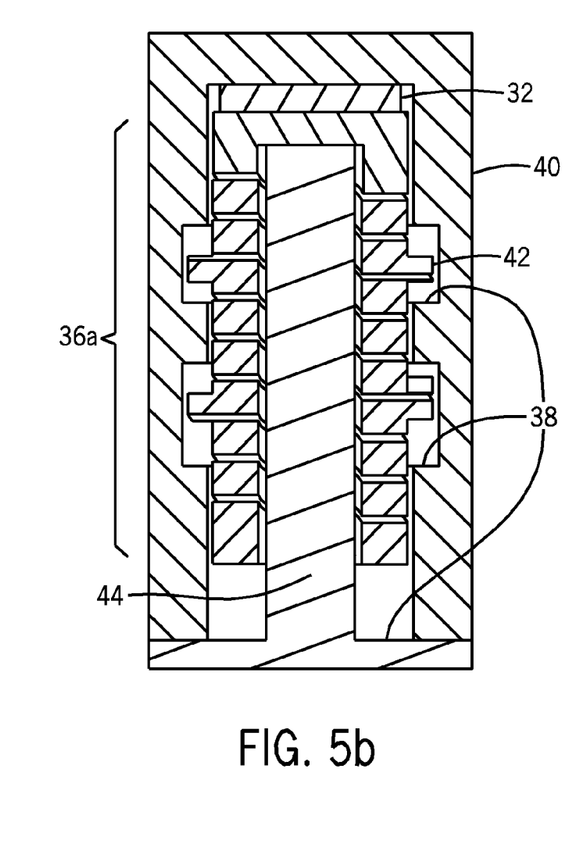

FIGS. 5a and 5b illustrate a variation of the embodiment of FIG. 4, employing a three-strand machined helical spring 36a which has two sets of hard-stop bosses 42 on the spring 36a which may engage corresponding supports 38 in the generator housing 40. A support member 44 supports the helical spring 36a in a cavity of the housing 40. This design effectively cuts to a third the length of unsupported sections of generator spring 36a. Alternatively, three three discrete springs with shorter lengths may be used, however, the space considerations of three smaller generators may prohibit such an approach and a single spring will, in general, have a natural frequency which is one third of that for the three individual shorter springs, which will have efficiency advantages with respect to hysteresis losses.

Figure 6:
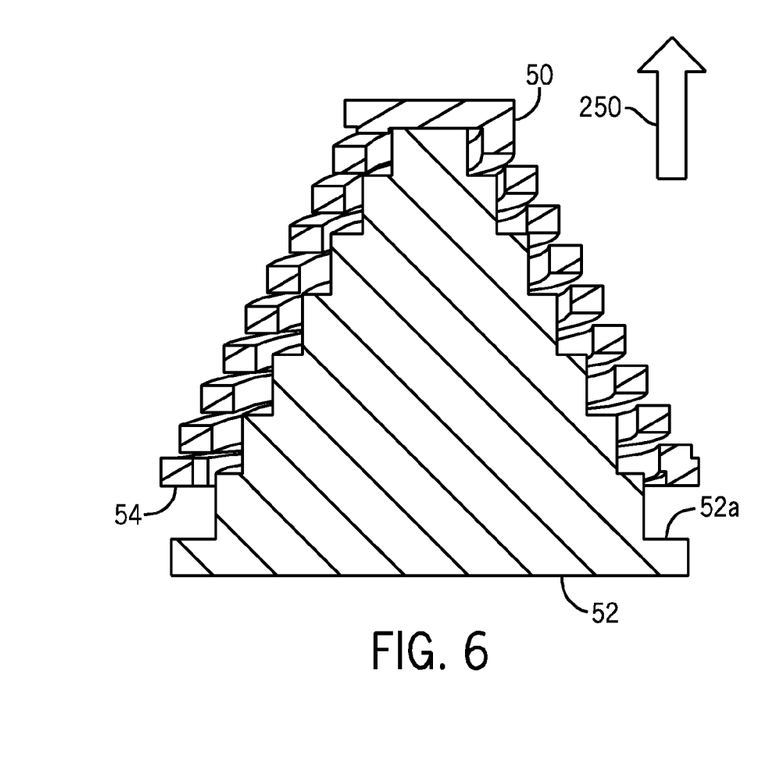
FIG. 6 illustrates a sectional view of an embodiment of a spring and support for use in an energy harvesting device.
Figure 7:
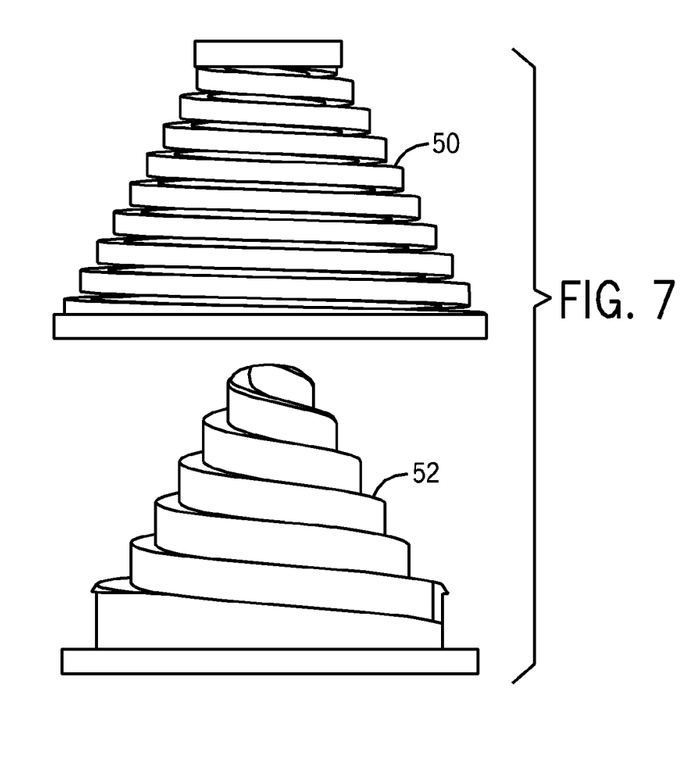
FIG. 7 illustrates an exploded view of the spring and support of FIG. 6.

Referring now to FIGS. 6 and 7, another embodiment is illustrated which also takes the approach of providing discrete supports for shortening the unsupported sections of a generator's mass-spring unit to continuous support. In the spring element 50, the taper angle of the helix allows for a complimentary helical support 52 to be placed such that the entire length of each helical strand of the helical spring 50 may be supported at a particular deflection caused by the firing acceleration 250. For clarity, only the spring-mass element and the helical support are shown in FIGS. 6 and 7. The spring 50 and support 52 can be used in place of the spring 36 and support 42(38) of FIG. 4, in which a free end 54 can displace up to the stop 52a and the spring exerts an oscillatory force on a piezoelectric element positioned between the spring 50 and a housing. Furthermore, although the support 52 is shown separately from the housing, it can be made integrally therewith and is in any event considered part of the housing. In FIG. 7, an exploded view of the subassembly is shown. In FIG. 6, a cross-section of the assembled sub-assembly is presented.

The embodiment of FIGS. 6 and 7 allows for maximum deflection (potential energy storage) throughout the spring while protecting the spring from deformations and failures that can result from high acceleration magnitudes.

Figure 8:
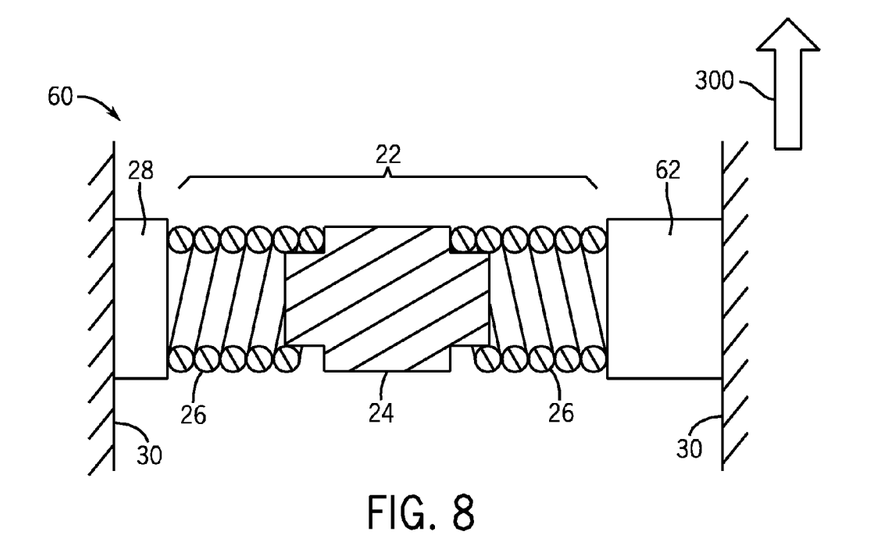
FIG. 8 illustrates a schematic view of another embodiment of an energy harvesting device.
Figure 9:
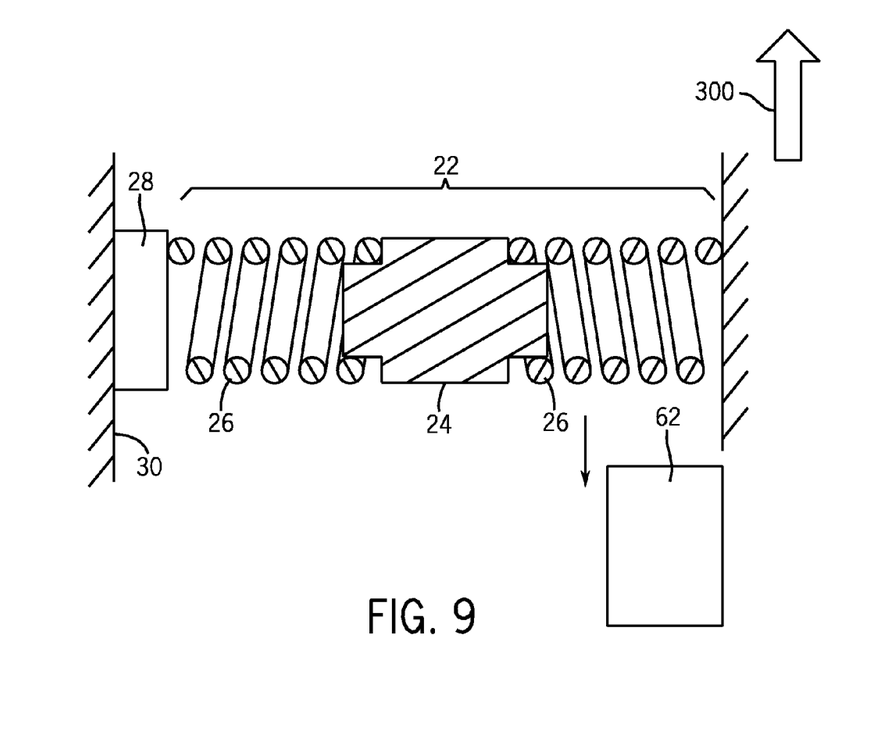
FIG. 9 illustrates the energy harvesting device of FIG. 8 during an acceleration event.

Referring now to FIGS. 8 and 9, there is shown another embodiment of an energy harvesting power source similar to the energy harvesting power source shown in FIG. 2 and oriented similarly relative to the direction of the firing acceleration 300. In FIG. 8, wherein similar features from FIG. 2 are illustrated with similar reference numerals, the generator 60 is shown prior to firing. In this state, the springs 26 are compressed (preloaded), such as to its solid length to maximize the stored potential energy. The generator 60 is also provided with a spacer element 62, which is positioned between a spring element 26 on one side the mass 24 and the generator housing 30. Then during the firing acceleration in the direction of the arrow 300, the firing acceleration acts on the inertial of the spacer 62, forcing it down (opposite to the direction of acceleration 300) and releasing the mass-spring unit 22 as shown in FIG. 9, allowing it to begin to vibrate, thereby begin to generate electrical energy.

It is noted that in certain applications, the mass element may be positioned close enough to the interior surface of the generator housing so that as the firing acceleration is applied, the mass (and part of the spring) element would move down and come in contact with the interior surface of the generator, thereby allowing the housing to provide support for the mass, thereby protect the mass (and the spring) element from high acceleration levels.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be construed to cover all modifications that may fall within the scope of the appended claims.

What is claimed is:

1. An energy harvesting device comprising:
   a housing having an internal cavity;
   an energy generating device arranged in the cavity;
   a mass-spring element having a mass and an elastic element and being operatively connected to the energy generating device upon an acceleration of the housing to produce an electrical power; and
   a biasing member for biasing the mass in a direction having at least a component in an acceleration direction of the housing;
   wherein the biasing member includes a portion for engaging a portion of the mass and the portion of the biasing member includes one of a tab or indent and the portion of the mass includes the other of the tab or indent.

2. The energy harvesting device of claim 1, wherein the energy generating device is a piezoelectric element, the mass being arranged at one end of the elastic element and another end of the elastic element being connected to the piezoelectric element.

3. The energy harvesting device of claim 1, wherein the elastic element is a helical spring.

4. The energy harvesting device of claim 1, wherein the piezoelectric element comprises two piezoelectric elements arranged in the cavity and the elastic element comprises two elastic elements, each of the two elastic elements having a one end connected to the mass and another end connected to one of the two piezoelectric elements.

5. An energy harvesting device comprising:
   a housing having an internal cavity;
   an energy generating device arranged in the cavity;
   a mass-spring element having a mass and an elastic element and being operatively connected to the energy generating device upon an acceleration of the housing to produce an electrical power; and
   a biasing member for biasing the mass in a direction having at least a component in an acceleration direction of the housing
   wherein the biasing member is configured to deform upon an acceleration of the housing to preload the elastic element such that the mass-spring unit vibrates in the cavity after the acceleration ceases or diminishes.

6. The energy harvesting device of claim 5, wherein the deformation of the biasing member is a plastic deformation.

7. An energy harvesting device comprising:
   a housing having a cavity;
   an energy generating device arranged in the cavity;
   a mass-spring unit having an elastic element and a mass, the mass being a free end of the elastic element and arranged to vibrate in a direction of an acceleration of the housing;
   wherein the elastic member includes one or more stops arranged in a longitudinal direction of the elastic member and the housing includes a support corresponding to each of the one or more stops so as to limit a longitudinal deflection of the one or more stops.

8. The energy harvesting device of claim 7, wherein the energy generating device is a piezoelectric element.

9. The energy harvesting device of claim 7, wherein the one or more stops includes one stop which corresponds to the free end of the elastic element.

10. The energy harvesting device of claim 7, wherein the elastic element has a length in the longitudinal direction and the one or more stops comprises two or more stops arranged along the length of the elastic member, the housing including a support corresponding to each of the two or more stops.

11. The energy harvesting device of claim 10, wherein the elastic element has a cylindrical shape and the support comprises a groove formed in the housing corresponding to each of the two or more stops.

12. The energy harvesting device of claim 10, wherein the elastic element has a pyramid shape and the support has a mating pyramid shape having a step shaped support corresponding to each of the two or more stops.

13. An energy harvesting device comprising:
   a housing having a cavity;
   an energy generating device arranged in the cavity;
   a mass-spring element having a mass and an elastic element and being operatively connected to the energy generating device upon an acceleration of the housing to produce an electrical power; and
   a spacer arranged in the cavity, the spacer having a first position so as to limit a vibration of the mass-spring unit and a second position permitting the mass-spring unit to vibrate, the spacer being movable from the first position to the second position due to an acceleration of the housing.

14. The energy harvesting device of claim 13, wherein the energy generating device is a piezoelectric element, the mass being arranged at one end of the elastic element and another end of the elastic element being connected to the piezoelectric element.

15. The energy harvesting device of claim 13, wherein the mass-spring unit is configured to vibrate in a direction offset from a direction in which the spacer is movable.

16. The energy harvesting device of claim 15, wherein the direction offset from the direction in which the spacer is movable is orthogonal to the direction in which the spacer is movable.

17. The energy harvesting device of claim 15, wherein the elastic element includes first and second elastic elements, each having an end attached to the mass.

18. A method for harvesting energy from a high-G acceleration of a munition, the method comprising:
   proving a vibrating mass-spring unit in a housing of an energy harvesting device; and
   reducing an effective acceleration on the mass-spring unit by one or more of:

offsetting the vibration of the mass-spring unit with respect to a direction of the high-G acceleration;

biasing a mass of the mass-spring unit in a direction having at least a component in the direction of the high-G acceleration;

limiting a vibration deflection of at least a portion of the mass-spring unit in the direction of the high-G acceleration; or limiting an amount of vibration of the mass-spring unit in a direction offset from the direction of the high-G acceleration and removing such limit after the acceleration.

\* \* \* \* \*